United States Patent Office 2,816,865
Patented Dec. 17, 1957

2,816,865

BAKING ENAMELS FROM ALKYD RESINS AND POLYMETHYLOL DERIVATIVES OF SUBSTITUTED GUANAMINES

Stuart H. Rider, Longmeadow, Thomas Anas, Springfield, and George L. Fraser, North Wilbraham, Mass., assignors to Monsanto Chemical Company, St. Louis, Mo., a corporation of Delaware No Drawing. Application March 16, 1954,
Serial No. 416,696

6 Claims. (Cl. 260—21)

This invention relates to baking enamels. More particularly, this invention relates to alcohol-free baking enamels.

Baking enamels comprising a free-flowing organic solvent solution of a major amount of an alkyd resin and a lesser amount of an alkylated methylol derivative of melamine are in widespread use at the present time. The alkylated derivatives and the alkyd resins are soluble to varying degrees in a wide variety of organic solvents such as aromatic hydrocarbons and aliphatic alcohols. In addition, the alkylated derivatives are soluble to an appreciable extent in alkyd resins. An esterification reaction occurs when an alkylated methylol derivative of melamine is brought into solution in an alkyd resin, the rate of reaction increasing as the temperature increases and as the concentration of the alkylated derivative in the alkyd resin increases. At room temperature the reaction proceeds at a comparatively slow rate but, even so, resin solution stability is seriously affected unless the concentration of the alkylated derivative in the alkyd resin is kept low. Thus, for example, if an alkyd resin and an alkylated methylol derivative of melamine are dissolved in an amount of an aromatic hydrocarbon solvent sufficient to provide an initially free-flowing solution, it will normally be found that gellation occurs within a comparatively short time (e. g. 3–5 weeks). If, on the other hand, an appropriate amount of the aromatic hydrocarbon is replaced with an aliphatic alcohol, the baking enamel is stabilized because of the greater solvency power of the aliphatic alcohol for the alkylated derivative and the alkyd resin. Solutions of alkyd resins and alkylated methylol derivatives of melamine in suitable mixtures of aromatic hydrocarbons and aliphatic alcohols can be stored for a year or more without gellation. Consequently, conventional baking enamels normally contain aliphatic alcohols. The alcohols contained in such enamels are irritating to workmen and also generally impart an unpleasant odor to the enamel. In addition, the alcohols are relatively expensive as compared with aromatic hydrocarbons such as xylol and thus materially increase the cost of the baking enamel.

The problem of alcohol content cannot be completely overcome even if the aliphatic alcohol is eliminated and the baking enamel is used shortly after preparation. The alkylated methylol derivatives are prepared by reacting an aliphatic alcohol with a methylol derivative of melamine and, as a practical matter, such alkylated derivatives, even when isolated, are contaminated with unreacted alcohol. Generally speaking, the amount of unreacted alcohol present in the alkylated melamine will be sufficient to cause irritation to workmen and to impart an unpleasant odor even when an otherwise alcohol-free solvent is used for the alkyd resin and the alkylated derivative.

Accordingly, an object of the present invention is the provision of alcohol-free baking enamels.

Another object is the provision of baking enamels comprising alcohol-free solvent solutions of alkyd resins and compatible non-alkylated triazine derivatives.

These and other objects are attained by dissolving an alkyd resin having an acid number of less than about 15 and a di- tri- or tetramethylol derivative of an aryl or aralkyl guanamine in a suitable alcohol-free organic solvent.

The following examples are given in illustration and are not intended as limitations on the scope of this invention. Where parts are mentioned, they are parts by weight.

EXAMPLE I

*Preparation of methylol derivatives*

Form a slurry by adding about 200 parts of powdered benzoguanamine to about 325 parts of an aqueous 37% solution of formaldehyde. Adjust the pH of the slurry to about 8 with a dilute solution of sodium hydroxide. Form the tetramethylol derivative of benzoguanamine by heating the slurry at a temperature of about 70° C. with agitation until the benzoguanamine is dissolved and a clear solution is formed, continuing the agitation and heating for about 20 minutes after the solution clears. At the end of this time add an equal volume of water and allow the diluted solution to cool. On standing, the tetramethylol derivative of benzoguanamine is precipitated in the form of fine crystals. Recover the precipitate by filtration, wash and dry the same.

Prepare the dimethylol derivative of benzoguanamine by reacting about 200 parts of benzoguanamine with about 175 parts of a 37% aqueous solution of formaldehyde in accordance with the above described procedure.

In similar fashion, react about 200 parts of phenylacetoguanamine with 325 parts of a 37% aqueous solution of formaldehyde in order to form the tetramethylol derivative of phenylacetoguanamine. Similarly, react about 130 parts of melamine with 325 parts of a 37% aqueous solution of formaldehyde in order to prepare the tetramethylol derivative of melamine.

EXAMPLE II

*Preparation of baking enamels*

Prepare a plurality of baking enamels, each containing one of the above-described derivatives. In preparing each enamel, heat a solution of about 100 parts of an alkyd resin in about 200 parts of an aromatic hydrocarbon solvent such as xylol to a temperature of about 50° C. and, with agitation, add thereto about 20 parts of one of the described methylol derivatives. Use any suitable alkyd resin having an acid number of less than about 15 such as an intercondensation product of about 25 parts phthalic anhydride, 40 parts glycerol and 35 parts soyabean oil fatty acids. An alkyd resin of this composition will have an acid number of about 8.

The di-and tetramethylol derivatives of benzoguanamine and the tetramethylol derivative of phenylacetoguanamine will dissolve in their respective alkyd resin solutions to form baking enamels.

Flow portions of each of the methylol guanamine-containing baking enamels on glass plates and bake for about 20 minutes at a temperature of about 150° C. Strong, clear and durable films are formed. The baking enamels have satisfactory storage stability as evidenced by the fact that they are still free-flowing at the end of a three months storage period.

By way of contrast, when the tetramethylol derivative of melamine is added to the alkyd resin solution, it remains insoluble and forms into lumpy curds which will not dissolve in the alkyd resin solution even on prolonged agitation at a temperature of about 100° C.

The methylol derivatives which can be blended with alkyd resins to form the baking enamels of the present invention are the di-, tri- and tetramethylol derivatives of aryl guanamines and aralkyl guanamines having 1–4 carbon atoms in the alkyl radical. Representative guanamines that may be used to prepare the methylol derivatives include benzoguanamine, o-tolyl guanamine, o-xylol guanamine, phenylacetoguanamine, phenyl propionoguanamine, valeroguanamine (2-phenylbutyl-4,6-diamino-1,3,-5-triazine), tolyl acetoguanamine, etc. Mixtures of two or more methylol derivatives may be used if desired.

In preparing the methylol derivatives, from about 2-4 mols of formaldehyde or a polymer thereof, such as paraformaldehyde, trioxymethylene, etc. should be reacted with each mol of guanamine. The methylol derivatives are easily prepared by reacting formaldehyde or a polymer thereof with the guanamine with agitation in aqueous solution at a temperature of about 50-100° C. under alkaline conditions, the heating and agitation being continued for a comparatively short time, such as 20-30 minutes, after the last of the guanamine has gone into solution. It is preferable to dilute the reaction mixture with a relatively large excess of water at the end of the reaction and to allow the diluted mixture to cool in order to cause the precipitation of the methylol derivative in the form of fine granular crystals.

A wide variety of alkyd resins having an acid number of less than about 15 are available and are well-known to those skilled in the art. The alkyd resins useful in the preparation of baking enamels are preferably prepared by intercondensing a dicarboxylic acid and a monocarboxylic fatty acid with a polyhydric alcohol containing 3 or more hydroxyl groups. If desired, a dihydric alcohol can be intercondensed with a monocarboxylic fatty acid and a polycarboxylic acid containing 3 or more carboxylic acid groups. Representative polycarboxylic acids that may be used include succinic acid, glutaric acid, adipic acid, sebacic acid, phthalic acid, biphenyl dicarboxylic acid, the anhydrides thereof, adducts of 1:4 dienes and maleic anhydride, etc. Illustrative polyhydric alcohols that may be used include sorbitol, mannitol, pentaerythritol, glycerol, trimethylol ethane, trimethylol propane, etc. Suitable monocarboxylic fatty acids include soyabean oil fatty acids, coconut oil fatty acids, dehydrated castor oil fatty acids, linseed oil fatty acids, etc. The alkyd resin should comprise about 30-60% by weight of monocarboxylic fatty acid (i. e., should have a 30-60% oil length).

The organic solvents to be used in accordance with the present invention are the aromatic hydrocarbons and mixtures of such aromatic hydrocarbons with each other or with aliphatic hydrocarbons. When an aliphatic hydrocarbon is mixed with an aromatic hydrocarbon, the aromatic hydrocarbon should comprise the major portion of the mixture. Numerous examples of such solvents are well-known to those skilled in the art. Representative of the aromatic hydrocarbon solvents are benzene, toluene, xylol, etc. and representative of the aliphatic hydrocarbons are hexane, heptane, etc. The proportions of the alkyd resin, methylol derivative and solvent may be varied as desired but, generally speaking, it is preferable to use a composition comprising, on a solids basis, from about 70-95% alkyd resin and, correspondingly, from about 30-5% methylol derivative. The amount of solvent to be used should be sufficient to provide a free-flowing solution of the two ingredients.

In preparing the baking enamels, the alkyd resin should first be dissolved in the solvent. The methylol derivative should then be added to this solution. This is of importance because the methylol derivatives of the aryl and aralkyl guanamines are substantially insoluble in the solvents of the present invention and essentially go into solution in the alkyd resin. It is preferable to add the methylol derivative with agitation and to heat the alkyd resin solution to a moderate extent during the addition. Preferably, temperatures of about 40-60° C. are used. The baking enamels of the present invention can be cured on being heated at temperatures of about 120-180° C. for periods of time varying from about 15 minutes to one hour.

Various other conventional additives may be used if desired, such as pigments or other suitable colorants, driers, accelerators, fillers, etc. The additives may be added to the alkyd resin solution prior to, simultaneously with, or subsequent to the addition of the methylol derivative.

What is claimed is:

1. An alcohol-free baking enamel consisting essentially of a free-flowing solution of about 70-95 parts by weight of an alkyd resin having an oil length of about 30-60% and an acid number of less than about 15 and, correspondingly, about 30-5 parts by weight of a compound taken from the group consisting of di-, tri- and tetramethylol derivatives of aryl guanamines and aralkyl guanamines having 1-4 carbon atoms in the alkyl radical in a solvent taken from the group consisting of aromatic hydrocarbon solvents and mixtures of a major amount of an aromatic hydrocarbon solvent with a minor amount of an aliphatic hydrocarbon solvent, said compounds being crystalline materials prepared by heating 1 mol of the guanamine with 2-4 mols of formaldehyde at temperatures of 50-100° C. in an aqueous alkaline solution.

2. A baking enamel as in claim 1 wherein the methylol derivative is a methylol derivative of an aryl guanamine.

3. A baking enamel as in claim 2 wherein the aryl guanamine is benzoguanamine.

4. A baking enamel as in claim 1 wherein the methylol derivative is a methylol derivative of an aralkyl guanamine.

5. A baking enamel as in claim 4 wherein the aralkyl guanamine is phenylacetoguanamine.

6. A process for preparing an alcohol-free baking enamel which consists essentially of dissolving about 70-95 parts by weight of an alkyd resin having an oil length of about 30-60% and an acid number of less than about 15 in a sufficient amount of a solvent taken from the group consisting of aromatic hydrocarbon solvents and mixtures of a major amount of an aromatic hydrocarbon solvent with a minor amount of an aliphatic hydrocarbon solvent to form a free-flowing solution and then adding to said solution, with agitation and moderate heating, from about 30-5 parts by weight of a compound taken from the group consisting of di-, tri- and tetramethylol derivatives of aryl guanamines and aralkyl guanamines having 1-4 carbon atoms in the alkyl radical, said compounds being crystalline materials prepared by heating 1 mol of the guanamine with 2-4 mols of formaldehyde at temperatures of 50-100° C. in an aqueous alkaline solution.

References Cited in the file of this patent
UNITED STATES PATENTS
2,579,980    Spencer _____ Dec. 25, 1951